United States Patent
Scheer

(10) Patent No.: US 9,958,935 B2
(45) Date of Patent: May 1, 2018

(54) METHODS AND SYSTEMS FOR FACILITATING REMOTE CONTROL BY A WEARABLE COMPUTER SYSTEM OF AN APPLICATION BEING EXECUTED BY A MEDIA CONTENT PROCESSING DEVICE

(71) Applicant: Verizon Patent and Licensing Inc., Arlington, VA (US)

(72) Inventor: Fred C. Scheer, North Andover, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 607 days.

(21) Appl. No.: 14/272,344

(22) Filed: May 7, 2014

(65) Prior Publication Data

US 2015/0323791 A1    Nov. 12, 2015

(51) Int. Cl.
| | | |
|---|---|---|
| *G06F 3/01* | (2006.01) | |
| *G02B 27/01* | (2006.01) | |
| *G06F 3/0488* | (2013.01) | |
| *H04N 21/422* | (2011.01) | |
| *G06F 1/16* | (2006.01) | |

(52) U.S. Cl.
CPC ............ *G06F 3/011* (2013.01); *G02B 27/017* (2013.01); *G06F 1/163* (2013.01); *G06F 3/017* (2013.01); *G06F 3/0488* (2013.01); *H04N 21/42203* (2013.01); *H04N 21/42204* (2013.01); *G02B 2027/0134* (2013.01); *G02B 2027/0178* (2013.01); *G02B 2027/0187* (2013.01); *H04N 21/422* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,442,631 | B1* | 9/2016 | Patel | G06F 3/0482 |
| 2013/0069787 | A1* | 3/2013 | Petrou | G02B 27/017 |
| | | | | 340/573.1 |
| 2014/0337634 | A1* | 11/2014 | Starner | H04L 9/3231 |
| | | | | 713/186 |
| 2014/0372944 | A1* | 12/2014 | Mulcahy | G06F 3/04815 |
| | | | | 715/810 |
| 2015/0121464 | A1* | 4/2015 | Hughes, Jr. | H04L 63/105 |
| | | | | 726/4 |

* cited by examiner

*Primary Examiner* — Robin Mishler

(57) ABSTRACT

An exemplary method includes a remote control management system detecting that a user wearing a wearable computer system that includes an optical head-mounted display is looking through the optical head-mounted display at a display screen associated with a media content processing device, determining, in response to the detecting, that the media content processing device is executing an application that is controllable by the wearable computer system, determining that the user is authorized to interact with the application being executed by the media content processing device, and establishing, in response to the determining that the media content processing device is executing the application and the determining that the user is authorized to interact with the application, a remote control session between the wearable computer system and the application. Corresponding systems and methods are also described.

22 Claims, 13 Drawing Sheets

METHODS AND SYSTEMS FOR FACILITATING REMOTE CONTROL BY A WEARABLE COMPUTER SYSTEM OF AN APPLICATION BEING EXECUTED BY A MEDIA CONTENT PROCESSING DEVICE

BACKGROUND INFORMATION

Media content processing devices, such as set-top box devices and television devices, are often configured to execute applications associated with media services (e.g., subscription-based media content streaming services) that allow users to access content provided by the media services. Users typically interact with such applications (e.g., by navigating through various on-screen menus, options, and other graphical content provided by the applications) using hand-held remote control devices. Unfortunately, because of the complexity of many hand-held remote control devices, it is often cumbersome, time consuming, and/or difficult for users to interact with applications executed by media content processing devices in this manner.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for facilitating remote control, by a wearable computer system that includes an optical head-mounted display, of an application being executed by a media content processing device are described herein. For example, as will be described in more detail below, a remote control management system may detect that a user wearing a wearable computer system that includes an optical head-mounted display is looking through the optical head-mounted display at a display screen (e.g., a television screen) associated with a media content processing device (e.g., a television device, a set-top box device, etc.). In response, the remote control management system may determine that the media content processing device is executing an application that is controllable by the wearable computer system and that the user is authorized to interact with the application. The remote control management system may then establish a remote control session between the wearable computer system and the application.

Once the remote control session between the wearable computer system and the application is established, the user may utilize the wearable computer system to remotely control the application. For example, the user may remotely control the application by moving his or her eyes and/or head, providing one or more voice commands, providing one or more touch pad gestures, and/or providing any other type of input permitted by the wearable computer system as may serve a particular implementation.

The methods and systems described herein may facilitate intuitive and convenient control by a user of an application being executed by a media content processing device. Moreover, the methods and systems described herein may facilitate automatic, efficient, and/or secure establishment of remote control sessions between wearable computing systems and applications executed by media content processing devices. These and other benefits and/or advantages of the methods and systems described herein will be made apparent by the following detailed description.

Figure 1:
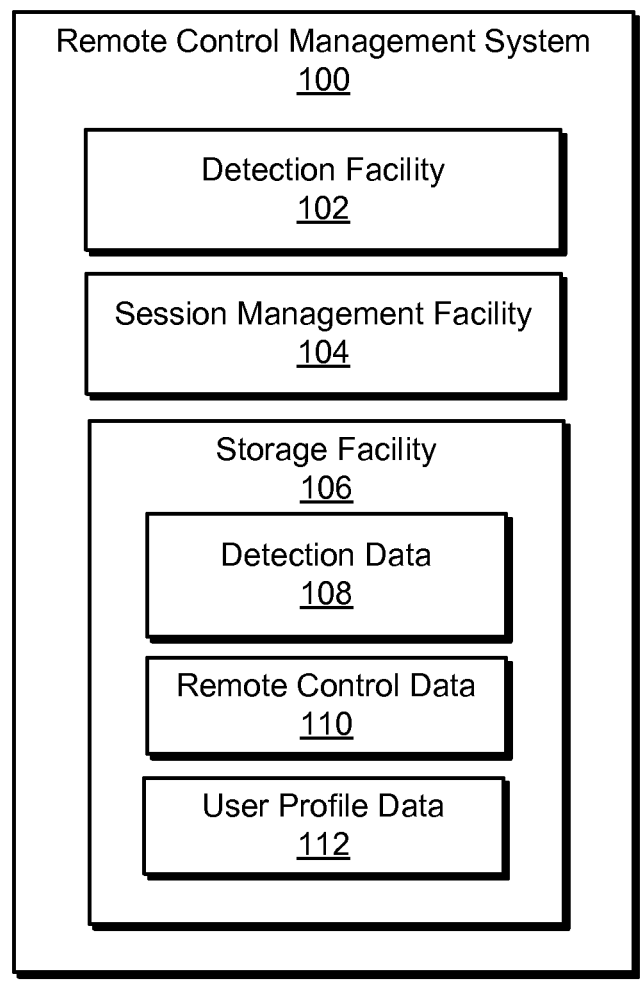
FIG. 1 illustrates an exemplary remote control management system according to principles described herein.

FIG. 1 illustrates an exemplary remote control management system 100 ("system 100") configured to facilitate remote control, by a wearable computing system that includes an optical head-mounted display, of an application being executed by a media content processing device. System 100 may be associated with (e.g., owned and/or managed by) a provider of the application (e.g., a media service provider), an entity associated with the media content processing device (e.g., a manufacturer of the media content processing device), a network provider (e.g., a subscriber television network provider), an entity associated with the wearable computing system (e.g., a manufacturer of the wearable computing system and/or a provider of a remote control application executed by the wearable computing system), and/or any other entity as may serve a particular implementation.

As shown, system 100 may include, without limitation, a detection facility 102, a session management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and/or external to system 100 in other implementations. For example, storage facility 106 may be external of and communicatively coupled to system 100 in certain alternative implementations. Facilities 102-106 of system 100 may include or be otherwise implemented by one or more computing devices configured to perform one or more of the operations described herein. In such implementations, system 100 may be referred to as a computer-implemented system 100.

As shown, storage facility 106 may store detection data 108 generated and/or used by detection facility 102, remote control data 110 generated and/or used by session management facility 104, and user profile data 112 representative of one or more user profiles of one or more users of system 100. Storage facility 106 may additionally or alternatively store any other type of data as may serve a particular implementation.

Data stored by storage facility 106 may be accessed by system 100 from any suitable source, including a source internal or external to system 100. Storage facility 106 may permanently or temporarily store data. In certain examples, system 100 may access data from a source external to system 100 and temporarily store the data in storage facility 106 for use by detection facility 102 and/or session management facility 104.

Detection facility 102 may detect that a user wearing a wearable computer system that includes an optical head-mounted display is looking through the optical head-mounted display at a display screen associated with a media content processing device.

Figure 2:
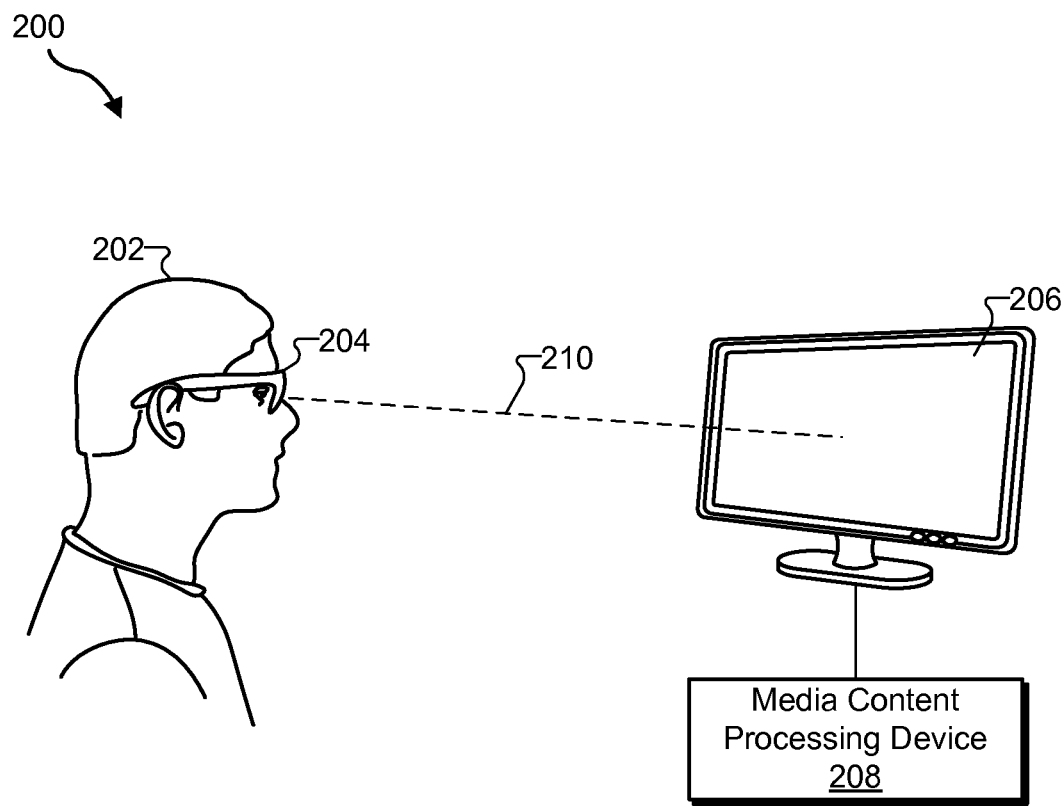
FIG. 2 shows an exemplary scenario in which a user wearing a wearable computer system that includes an optical head-mounted display is looking through the optical head-mounted display at a display screen associated with a media content processing device according to principles described herein.

To illustrate, FIG. 2 shows an exemplary scenario 200 in which a user 202 wearing a wearable computer system 204 that includes an optical head-mounted display is looking through the optical head-mounted display at a display screen 206 associated with a media content processing device 208 ("processing device 208"). Dotted line 210 represents a line of sight of user 202 while user 202 is looking at display screen 206. The various components shown in FIG. 2 will now be described.

Figure 3:
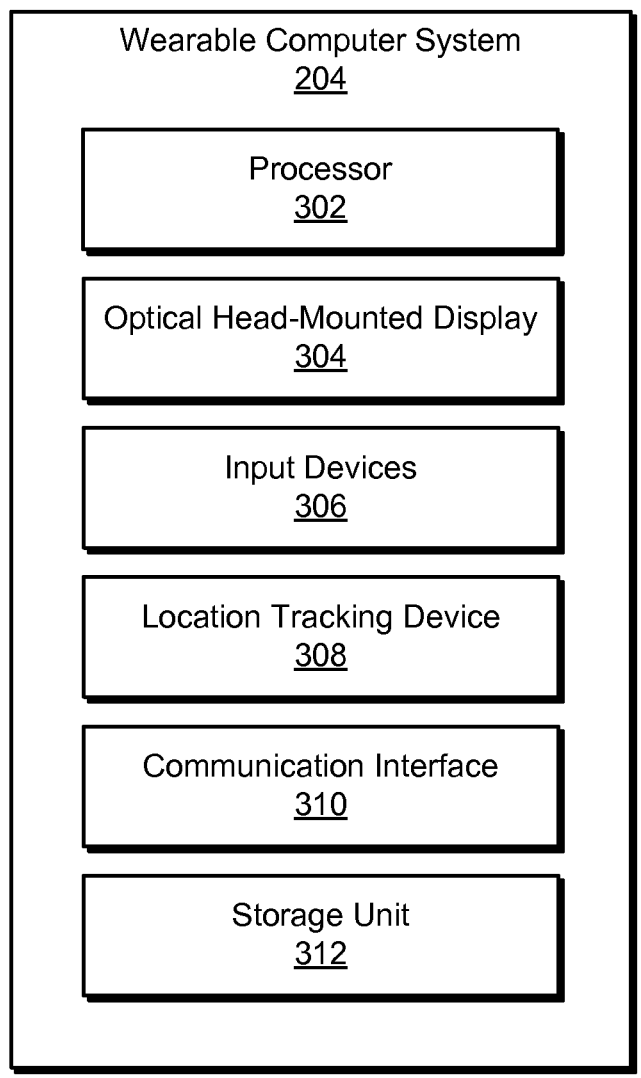
FIG. 3 illustrates exemplary components of a wearable computer system according to principles described herein.

FIG. 3 illustrates exemplary components of wearable computer system 204. In some examples, wearable computer system 204 may be implemented by a single wearable device (e.g., smart glasses). Additionally or alternatively, wearable computer system 204 may be implemented by separate wearable devices (e.g., a wearable processing unit that the user carries, e.g., in his pocket, and that communicates with a separate optical head-mounted display, e.g., by way of a wired or wireless link).

As shown, wearable computer system 204 may include a processor 302, an optical head-mounted display 304, input devices 306, a location tracking device 308, a communication interface 310, and a storage unit 312. Wearable computer system 204 may include additional or alternative components as may serve a particular implementation.

Processor 302 may include one or more processors configured to perform one or more of the operations described herein. For example, processor 302 may execute one or more applications (e.g., a remote control application) stored within storage unit 312, process input received by way of input devices 306 and/or location tracking device 308, and/or direct optical head-mounted display 304 to display one or more images.

Optical head-mounted display 304 may include any transparent display that has the capability of reflecting projected images as well as allowing a user to see through it. For example, optical head-mounted display 304 may be implemented by a heads-up display (e.g., smart glasses, such as those shown in FIG. 2), goggles, wearable contact lenses, and/or any other wearable display through which the user may see.

Input devices 306 may include any combination of devices that facilitate input provided by the user and/or one or more other sources. For example, input devices 306 may include one or more cameras and/or other sensors that track movement of the user's eyes and/or head (e.g., so that system 100 may determine what the user is looking at at any given time). Input devices 306 may additionally or alternatively include one or more touchpads configured to facilitate input by a user of one or more touch pad gestures, one or more buttons configured to facilitate selection by a user of one or more options, a microphone configured to facilitate input of one or more voice commands spoken by the user, a keyboard configured to facilitate text input, and/or any other type of input device as may serve a particular implementation.

Location tracking device 308 may include any suitable device configured to track a location of wearable computer system 204. For example, location tracking device 308 may include a global positioning service ("GPS") device that detects GPS coordinates of wearable computer system 204.

Communication interface 310 may be configured to facilitate communication of wearable computer system 204 with one or more other devices. For example, communication interface 310 may include one or more components configured to facilitate connection of wearable computer system 204 to a network (e.g., a local area network, such as a Wi-Fi network). Additionally or alternatively, communication interface 310 may include one or more components configured to facilitate direct connection (e.g., by way of a near field communication link or a Bluetooth link) of wearable computer system 204 to a media content processing device (e.g., media content processing device 208).

Storage unit 312 may store any type of data as may serve a particular implementation. For example, storage unit 312 may store data representative of one or more applications (e.g., a remote control application) that may be executed by wearable computer system 204.

Returning to FIG. 2, processing device 208 may be implemented by any device configured to process (e.g., receive and present) media content. For example, processing device 208 may be implemented by a television device, a set-top box device, a gaming console, a media player computing device (e.g., a media disc player device such as a digital video disc ("DVD") or BLUERAY DISC ("BD") player device), a digital video recording ("DVR") device, a computer, a mobile device (e.g., a tablet computer or a smart phone device), and/or any other computing device as may serve a particular implementation. As used herein, the terms "media content" may refer to a television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, and/or any other media instance that may be presented by way of a processing device.

Display screen 206 may be implemented by any suitable display configured to be in communication with processing device 208. For example, display screen 206 may be implemented by a television screen, a computer monitor screen, a screen that displays projected content, and/or any other type of display screen as may serve a particular implementation.

While FIG. 2 shows processing device 208 and display screen 206 as separate devices, it will be recognized that in some examples, processing device 208 and display screen 206 may be integrated into a single device. For example, processing device 208 and display screen 206 may be integrated into a television device configured to execute an application associated with a media service.

Detection facility 102 may detect that user 202 is looking through the optical head-mounted display of wearable computer system 204 at display screen 206 in any suitable manner. For example, detection facility 102 may utilize data acquired by one or more cameras and/or other sensors included in input devices 306 of wearable computer system 204 to determine that the eyes of user 202 are fixated upon display screen 206 for an uninterrupted predetermined amount of time (e.g., for a predetermined number of seconds without looking away from display screen 206).

Detection facility 102 may determine that the user 202 is looking at display screen 206 (as opposed to one or more other objects) by detecting an object within the field of view of user 202 and determining that the object is representative of a display screen. This determination may be made in accordance with any suitable object recognition service as may serve a particular implementation.

Returning to FIG. 1, session management facility 104 may perform one or more remote control session management operations. For example, in response to detection facility 102 detecting that a user is looking through an optical head-mounted display of a wearable computer system at a display screen associated with a processing device, session management facility 104 may determine that the processing device is executing an application that is controllable by the wearable computer system. This may be performed in any suitable manner. For example, session management facility 104 may determine that the processing device is executing an application that corresponds to a remote control application being executed by the wearable computer system while the user is looking through the optical head-mounted display at the display screen.

To illustrate, referring again to FIG. 2, processing device 208 may be executing an application associated with a media service that provides on-demand media content. In response, session management facility 104 may determine whether a remote control application corresponding to the application associated with the media service is being executed (or resides within storage unit 312 and available for execution) by wearable computer system 204. If wearable computer system 204 is executing (or may execute) such a remote control application, session management facility 104 may attempt to establish a remote control session between wearable computer system 204 and the application being executed by processing device 208.

In some examples, session management facility 104 may determine that user 202 is authorized to interact with the application being executed by processing device 208 prior to attempting to establish a remote control session between wearable computer system 204 and the application being executed by processing device 208. This may be performed in any suitable manner.

For example, session management facility 104 may determine that user 202 is authorized to interact with the application being executed by processing device 208 by determining that user 202 is located within a geographic area pre-designated as being associated with user 202.

Figure 4:
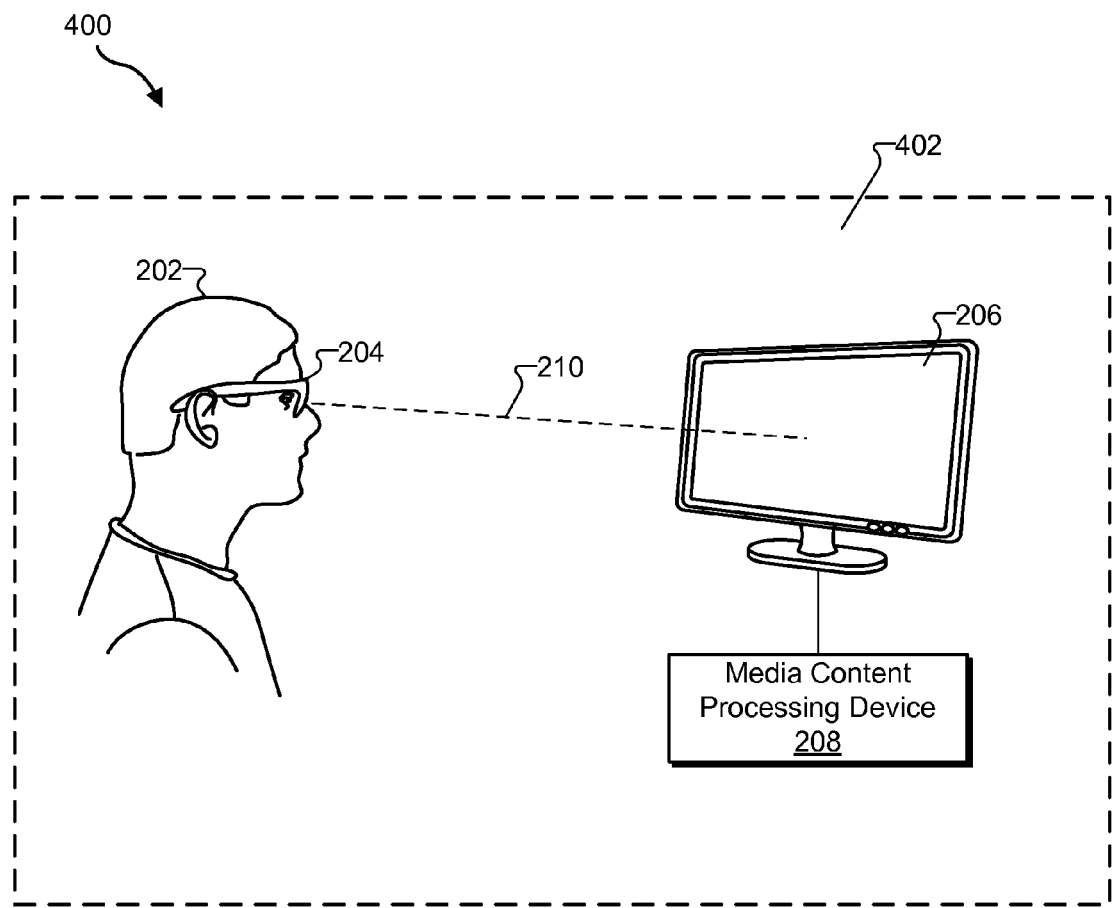
FIG. 4 shows an exemplary scenario in which a user is located within a geographic area pre-designated as being associated with the user according to principles described herein.

To illustrate, FIG. 4 shows an exemplary scenario 400 in which user 202 is located within a geographic area 402 pre-designated as being associated with user 202. Geographic area 402 may include a user premises (e.g., a home or a room) associated with (e.g., owned or rented by) user 202 and/or any other geographic area pre-designated as being associated with user 202 as may serve a particular implementation.

Geographic area 402 may be pre-designated as being associated with user 202 in any suitable manner. For example, boundaries of geographic area 402 may be defined within a user profile and/or account associated with the user (e.g., by a physical address associated with a media service account of the user). Additionally or alternatively, the user 202 may manually specify one or more geographic areas as being associated with user 202 within one or more settings associated with the application.

Session management facility 104 may determine that user 202 is located within geographic area 402 in any suitable manner. For example, session management facility 104 may detect GPS coordinates of user 202 (e.g., by accessing GPS data provided by location tracking device 308) while user 202 is looking through the optical head-mounted display at display screen 206. Session management facility 104 may then determine that the detected GPS coordinates are located within geographic area 402.

Additionally or alternatively, session management facility 104 may determine that user 202 is authorized to interact with the application being executed by processing device 208 by determining that wearable computer system 204 and processing device 208 are both connected to the same local area network (e.g., a Wi-Fi network).

Figure 5:
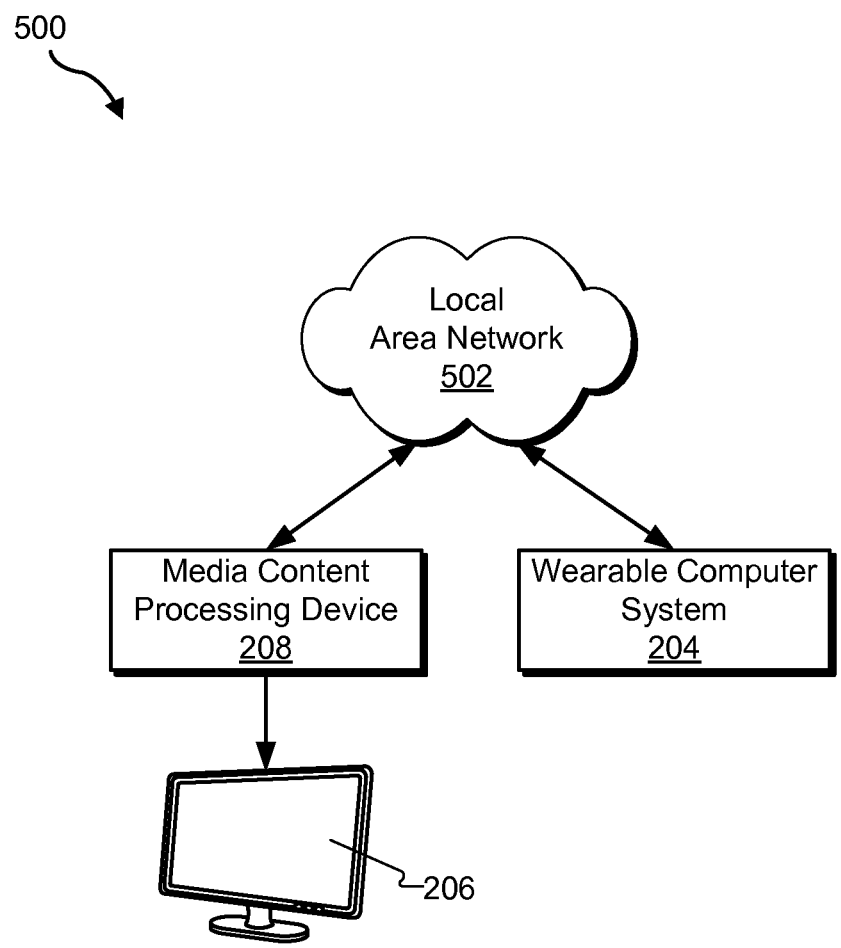
FIG. 5 illustrates an exemplary scenario in which a wearable computer system and a media content processing device are each connected to a local area network according to principles described herein.

To illustrate, FIG. 5 illustrates an exemplary scenario 500 in which wearable computer system 204 and processing device 208 are each connected to a local area network 502. Local area network 502 may include, for example, a wireless local area network (e.g., a Wi-Fi network). Session management facility 104 may detect that wearable computer system 204 and processing device 208 are both connected to local area network 502 and infer that user 202 is authorized to interact with the application. For example, if local area network 502 is password protected and wearable computer system 204 is able to connect to local area network 502, session management facility 104 may determine that user 202 is authorized to interact with the application. Additionally or alternatively, session management facility 104 may determine that user 202 is authorized to interact with the application being executed by processing device 208 by determining that local area network 502 is linked to user 202 (e.g., by determining that a name of local area network 502 is included in or otherwise associated with a user profile of user 202).

Session management facility 104 may additionally or alternatively determine that user 202 is authorized to interact with the application being executed by processing device 208 by detecting an identifier associated with processing device 208 and determining that the identifier is paired with a user profile of user 202. For example, in response to a determination that user 202 is looking at display screen 206 through the optical head-mounted display, session management facility 104 may query processing device 208 for an identity of processing device 208. In response, processing device 208 may provide data representative of the identity. Session management facility 104 may analyze the data and determine that the identity is paired with the user profile of user 202.

In response to determining that a processing device is executing an application that is controllable by a wearable computer system worn by a user and that the user is authorized to interact with the application, session management facility 104 may establish a remote control session between the wearable computer system and the application. The remote control session may be established by way of a local area network (e.g., local area network 502) and/or any other suitable network. Additionally or alternatively, the remote control session may be established directly between the wearable computer system and the processing device executing the application. The remote control session may be established in any suitable manner.

To illustrate, with reference again to FIG. 2, session management facility 104 may use any suitable discovery protocol to set up a bi-directional communication channel between wearable computer system 204 and the application being executed by processing device 208. The bi-directional communication channel may be by way of a local area network (e.g., local area network 502). Additionally or alternatively, the bi-directional channel may be established directly between wearable computer system 204 and processing device 208.

Once the bi-directional communication channel has been set up, wearable computer system 204 may transmit a remote control session request message to the application by way of the bi-directional communication channel. The remote control session request message may include authorization credentials associated with user 202 and/or wearable computer system 204 and may be transmitted in accordance with any suitable transmission protocol. Processing device 208 may receive and validate the authorization credentials in any suitable manner, and, in response, transmit a confirmation response to wearable computer system 204 by way of the bi-directional communication channel. Upon receiving the confirmation response, wearable computer system 204 may finalize the establishment of the remote control session.

In some examples, session management facility 104 may visually indicate to user 202 that a remote control session between wearable computer system 204 and the application being executed by processing device 208 is in the process of being established. This may be performed in any suitable manner.

Figure 6:
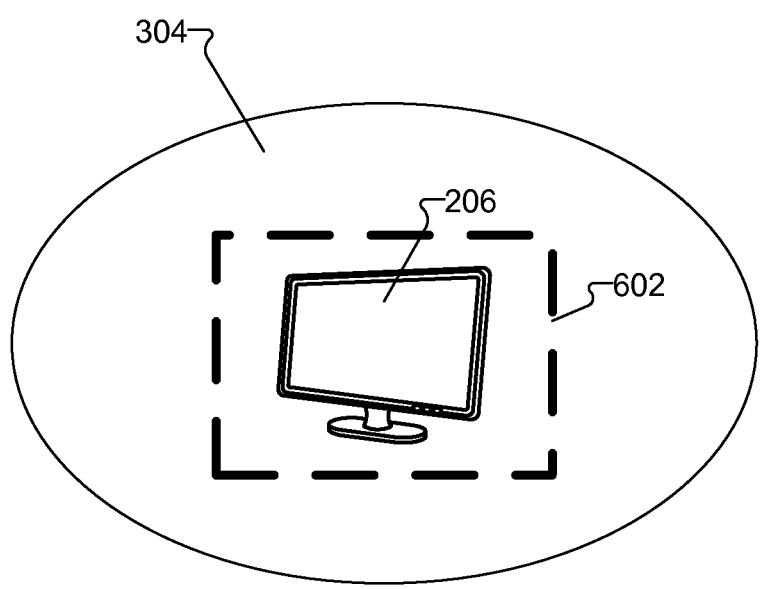
FIGS. 6-7 show exemplary views that a user may perceive through an optical head-mounted display of a wearable computer system according to principles described herein.

To illustrate, FIG. 6 shows an exemplary view that user 202 may perceive through optical head-mounted display 304 of wearable computer system 204 while a remote control session is being established between wearable computer system 204 and the application being executed by processing device 208. As represented by dashed-line box 602, session management facility 104 may visually indicate to user 202 that a remote control session between wearable computer system 204 and the application being executed by processing device 208 is in the process of being established by visually distinguishing a view of display screen 206 within optical head-mounted display 304. Session management facility 104 may visually distinguish the view of display screen 206 in any suitable manner while the remote control session is being established. For example, session management facility 104 may direct wearable computing system 204 to display a blinking colored halo within optical head-mounted display 304 that surrounds the user's view of display screen 206 while the remote control session is being established.

Session management facility 104 may additionally or alternatively visually indicate to user 202 that a remote control session between wearable computer system 204 and the application being executed by processing device 208 has been successfully established. This may be performed in any suitable manner.

Figure 7:
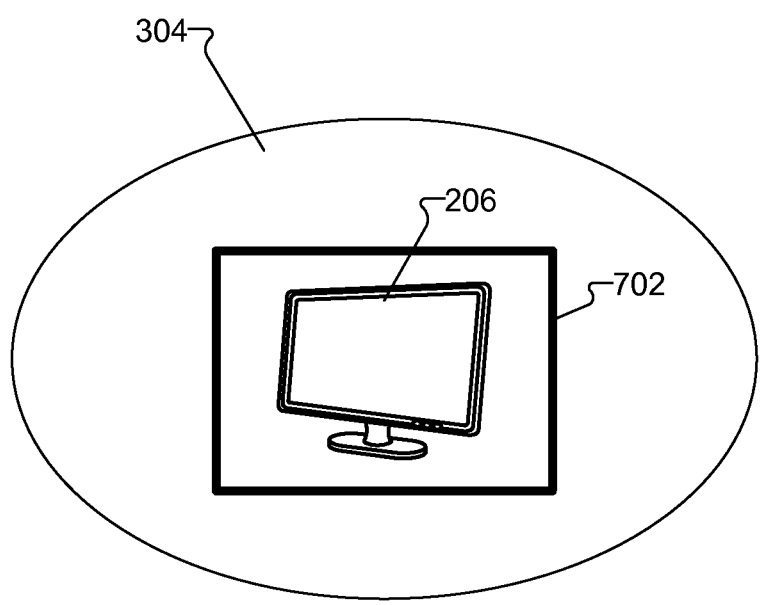

To illustrate, FIG. 7 shows an exemplary view that user 202 may perceive through optical head-mounted display 304 of wearable computer system 204 immediately after a remote control session is successfully established between wearable computer system 204 and the application being executed by processing device 208. As shown, the dashed-line box 602 has been replaced by a solid-line box 702 in order to visually indicate to user 202 that the remote control session has been successfully established. Solid-line box 702 may be representative of a solid halo having a different color than the blinking halo described in connection with FIG. 6. In some examples, the visual indication represented by solid box 702 may only be displayed for a predetermined amount of time (e.g., a few seconds) following successful establishment of the remote control session.

Once the remote control session has been established between wearable computer system 204 and the application being executed by processing device 208, the user 202 may perform a variety of different actions in order to remotely control the application. For example, user 202 may provide input to wearable computer system 204 by way of one or more of input devices 306 by moving his or her eyes and/or head, looking at a particular portion of an interface displayed within display screen 206 for a predetermined amount of time, performing a touch pad gesture, selecting a button, speaking a voice command, and/or performing any other action that may be detected by wearable computer system 204. In response, session management facility 104 may provide (e.g., transmit) one or more corresponding remote control commands (or facilitate transmission by wearable computer system 204 of one or more corresponding remote control commands) to the application being executed by processing device 208.

By way of example, processing device 208 may be executing an application provided by or otherwise associated with a media service that provides on-demand media content by way of processing device 208. A remote control session between the application and wearable computer system 204 may be established in any of the ways described herein so that user 202 may utilize wearable computer system 204 to interact with the application.

Figure 8:
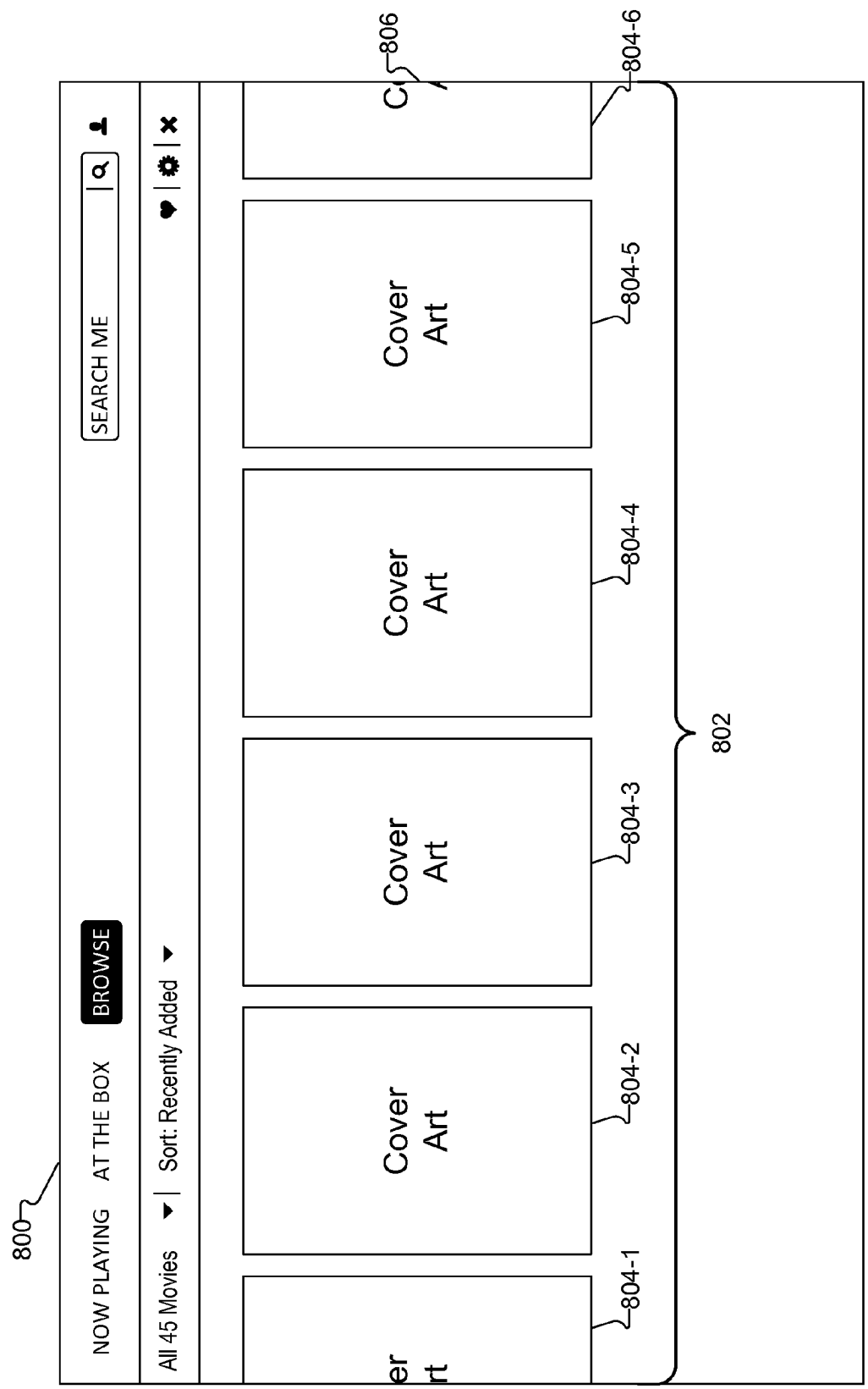
FIGS. 8-9 show exemplary views of an interface that may be associated with a media service application and displayed within a display screen according to principles described herein.

To illustrate, FIG. 8 shows an exemplary interface 800 that may be associated with the media service application and displayed within display screen 206. As shown, a media content offering list 802 may be displayed within interface 800. Media content offering list 802 may include entries 804 (e.g., entries 804-1 through 804-6) representative of media content instances (e.g., on-demand media programs) available for presentation by way of the media service. In the example of FIG. 8, each entry 804 is represented by a graphical object representative of cover art corresponding to a particular media content instance. It will be recognized that each entry 804 may alternatively be represented in any suitable manner.

In some examples, user 202 may desire to scroll through media content offering list 802 in order to locate a media content instance of interest to the user 202. To this end, user 202 may provide any of the various types of input to wearable computer system 204 as described herein. For example, user 202 may look through the optical head-mounted display at a displayed end (e.g., end 806) of the viewable portion of the media content offering list 802 and/or interface 800 for an uninterrupted predetermined amount of time. Session management facility 104 may detect that the user is looking at the displayed end for the uninterrupted predetermined amount of time, and, in response, may provide a remote control command to the application for the application to scroll the media content offering list 802 within the interface 800 that is displayed within display screen 206.

Figure 9:
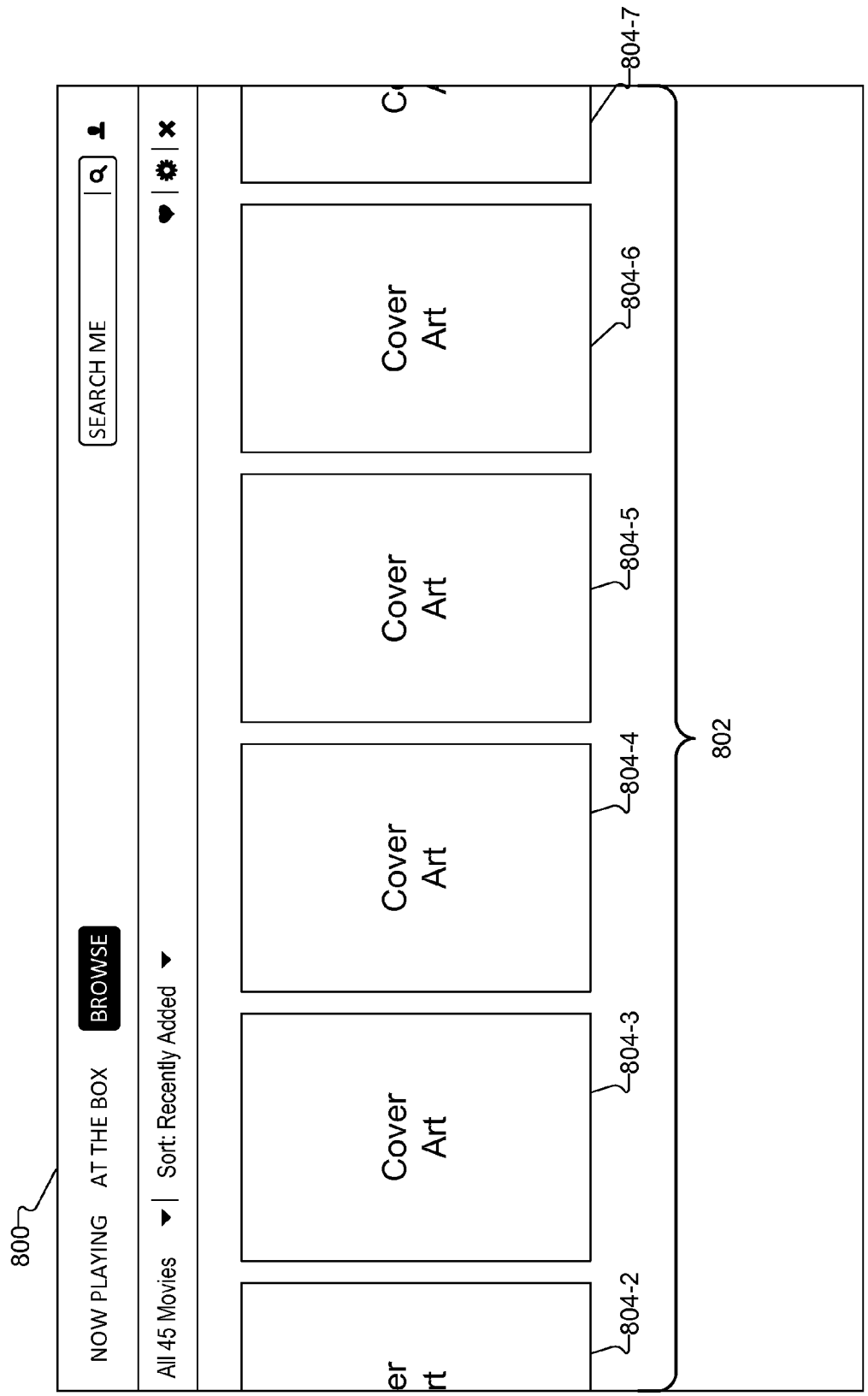

FIG. 9 shows interface 800 after session management facility 104 has provided the remote control command to the application for the application to scroll the media content offering list 802 within interface 800. As shown, media content offering list 802 has scrolled to the left by one entry such that entries 804-2 through 804-7 are now displayed within interface 800 instead of entries 804-1 through 804-6.

Session management facility 104 may detect that the user is looking at the displayed end 806 of media content offering list 802 (and/or any other object displayed within interface 800 in any suitable manner. For example, session management facility 104 may utilize any suitable object recognition service to identify one or more objects and/or or locations within interface 800 that the user is looking at at any given time as may serve a particular implementation.

Continuing with the example shown in FIGS. 8-9, user 202 may desire to view or otherwise experience a particular media content instance represented by an entry 804 included in media content offering list 802. To this end, user 202 may look through the optical head-mounted display at a particular entry (e.g., entry 804-5 for an uninterrupted predetermined amount of time. Session management facility 104 may detect that the user is looking at the entry for the uninterrupted predetermined amount of time, and, in response, may provide a remote control command to the application for the application to begin presenting the media content instance represented by the entry. One or more other types of input (e.g., one or more touch pad gestures and/or voice commands) may be provided by user 202 while the media content instance is being presented in order to access one or more playback controls associated with the media content instance.

Figure 10:
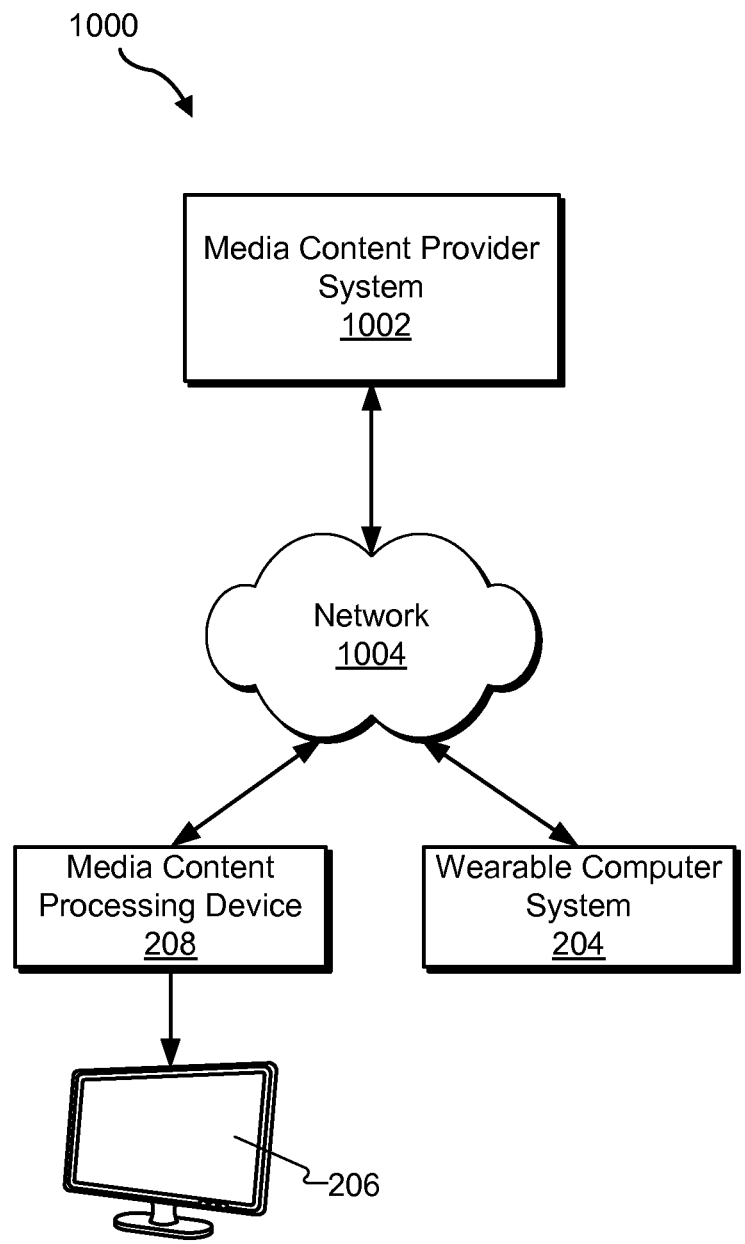
FIG. 10 illustrates an exemplary implementation of the system of FIG. 1 according to principles described herein.

FIG. 10 illustrates an exemplary implementation 1000 of system 100 wherein a media content provider system 1002 is communicatively coupled to wearable computer system 204 and processing device 208. Detection facility 102, session management facility 104, and storage facility 106 may each be implemented by media content provider system 1002, wearable computer system 204, and/or processing device 208. Accordingly, in certain embodiments, components of system 100 may be implemented entirely by media content provider system 1002 or entirely by wearable computer system 204. In other embodiments, components of system 100 may be distributed across media content provider system 1002, wearable computer system 204, and/or processing device 208.

Media content provider system 1002 may be associated with a service provider (e.g., a subscriber television service provider, an Internet service provider, etc.), a media content program provider (e.g., ESPN, NBC, etc.), and/or any other type of media content provider. Accordingly, media content provider system 1002 may be configured to provide one or more media content services (e.g., television services, video-on-demand services, Internet services, application services, etc.) to processing device 208. For example, media content provider system 1002 may be configured to manage (e.g., maintain, process, distribute, and/or generate) media content (e.g., media content programs, advertisements, etc.) configured to be delivered to processing device 208. Media content provider system 1002 may be implemented by one or more computing devices as may serve a particular implementation.

Additionally or alternatively, media content provider system 1002 may be implemented by one or more third party servers configured to manage recommended media content, interface with one or more social media service provider subsystems, and/or perform any other operation associated with the methods and systems described herein.

Media content provider system 1002, wearable computer system 204, and processing device 208 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, media content provider system 1002, wearable computer system 204, and processing device 208 may communicate via a network 1004. Network 1004 may include one or more networks, such as one or more wireless networks (e.g., Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between media content provider system 1002 and processing device 208. Communications between media content provider system 1002, wearable computer system 204, and processing device 208 may be transported using any one of the above-listed networks, or any combination or sub-combination of the above-listed networks. Alternatively, media content provider system 1002, wearable computer system 204, and processing device 208 may communicate in another way.

Figure 11:
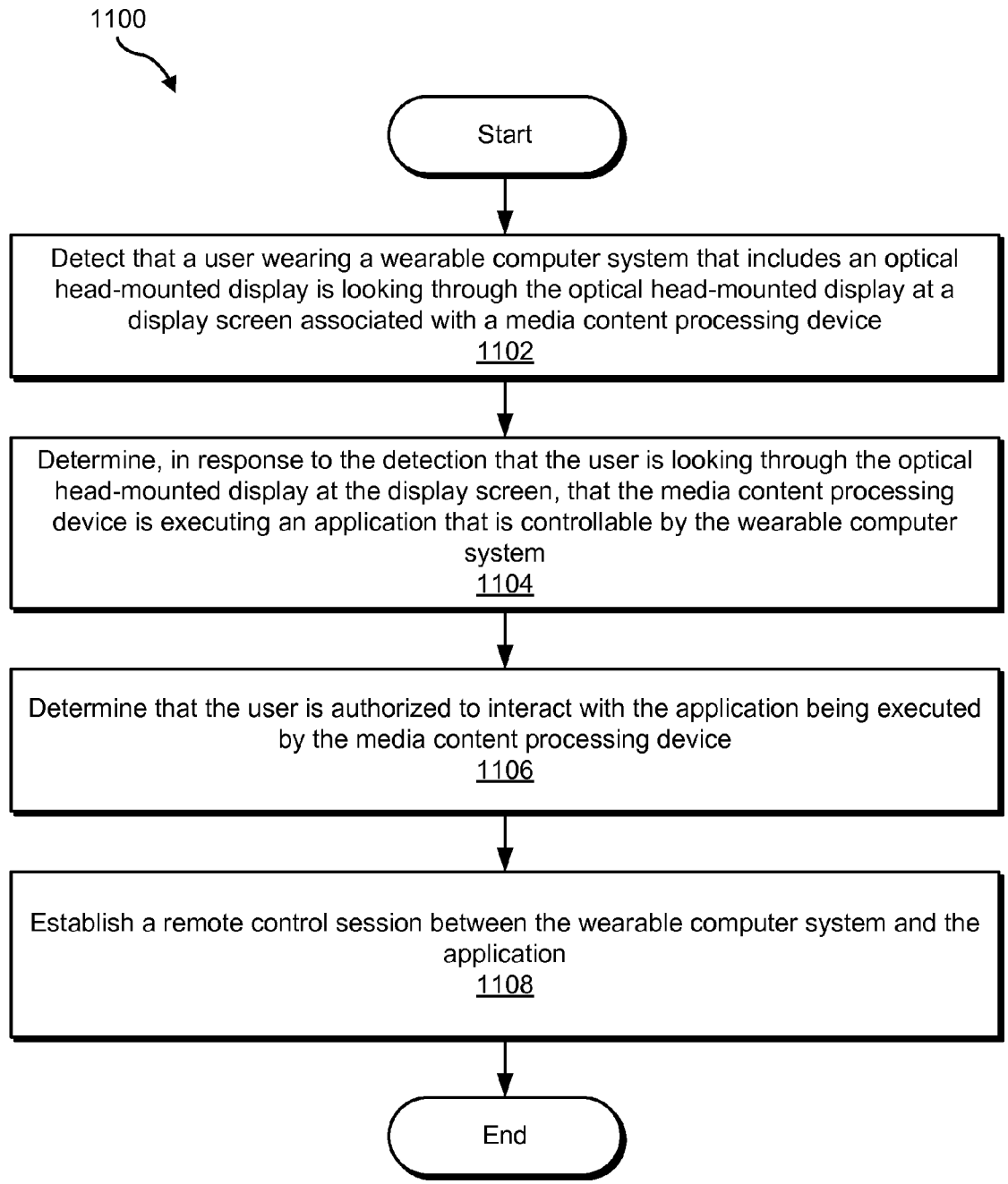
FIG. 11 illustrates an exemplary method of facilitating remote control by a wearable computer system of an application being executed by a media content processing device according to principles described herein.

FIG. 11 illustrates an exemplary method 1100 of facilitating remote control by a wearable computer system of an application being executed by a media content processing device. While FIG. 11 illustrates exemplary steps according to one embodiment, other embodiments may omit, add to, reorder, and/or modify any of the steps shown in FIG. 11. One or more of the steps shown in FIG. 11 may be performed by system 100 and/or any implementation thereof.

In step 1102, a remote control management system detects that a user wearing a wearable computer system that includes an optical head-mounted display is looking through the optical head-mounted display at a display screen associated with a media content processing device. Step 1102 may be performed in any of the ways described herein.

In step 1104, the remote control management system determines, in response to the detection that the user is looking through the optical head-mounted display at the display screen, that the media content processing device is executing an application that is controllable by the wearable computer system. Step 1104 may be performed in any of the ways described herein.

In step 1106, the remote control management system determines that the user is authorized to interact with the application being executed by the media content processing device. Step 1106 may be performed in any of the ways described herein.

In step 1108, the remote control management system establishes a remote control session between the wearable computer system and the application. Step 1108 may be performed in any of the ways described herein. For example, step 1108 may be performed in response to the determination that the media content processing device is executing the application and the determination that the user is authorized to interact with the application.

Figure 12:
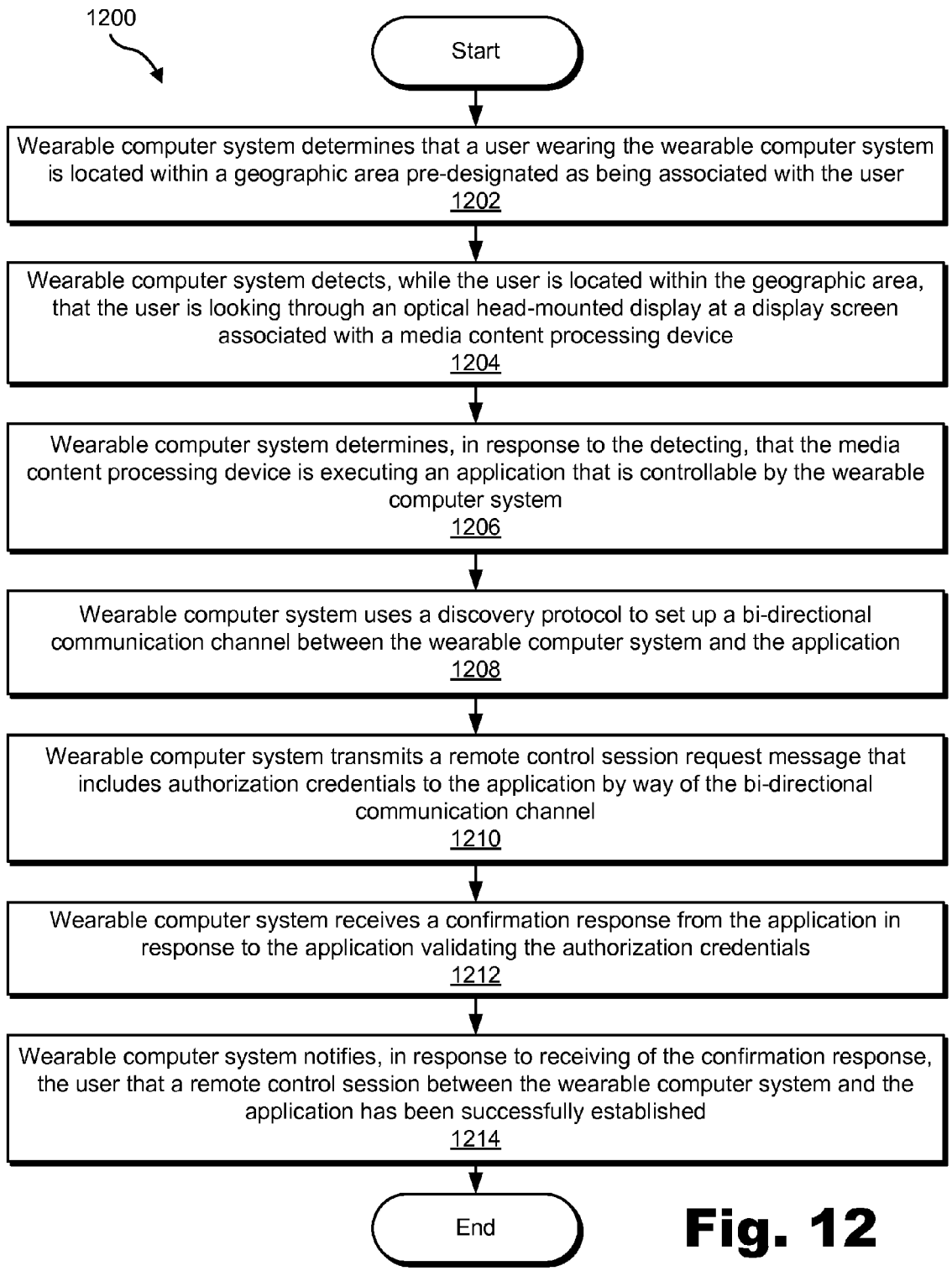
FIG. 12 illustrates another exemplary method of facilitating remote control by a wearable computer system of an application being executed by a media content processing device according to principles described herein.

FIG. 12 illustrates another exemplary method 1200 of facilitating remote control by a wearable computer system of an application being executed by a media content processing device. While FIG. 12 illustrates exemplary steps according to one embodiment, other embodiments may omit, add to, reorder, and/or modify any of the steps shown in FIG. 12. One or more of the steps shown in FIG. 12 may be performed by wearable computer system 204 and/or any implementation thereof.

In step 1202, a wearable computer system determines that a user wearing the wearable computer system is located within a geographic area pre-designated as being associated with the user. Step 1202 may be performed in any of the ways described herein.

In step 1204, the wearable computer system detects, while the user is located within the geographic area, that the user is looking through an optical head-mounted display at a display screen associated with a media content processing device. Step 1204 may be performed in any of the ways described herein.

In step 1206, the wearable computer system determines, in response to the detecting, that the media content processing device is executing an application that is controllable by the wearable computer system. Step 1206 may be performed in any of the ways described herein.

In step 1208, the wearable computer system uses a discovery protocol to set up a bi-directional communication channel between the wearable computer system and the application. Step 1208 may be performed in any of the ways described herein.

In step 1210, the wearable computer system transmits a remote control session request message that includes authorization credentials to the application by way of the bi-directional communication channel. Step 1210 may be performed in any of the ways described herein.

In step 1212, the wearable computer system receives a confirmation response from the application in response to the application validating the authorization credentials. Step 1212 may be performed in any of the ways described herein.

In step 1214, the wearable computer system notifies, in response to receiving of the confirmation response, the user that a remote control session between the wearable computer system and the application has been successfully established. Step 1214 may be performed in any of the ways described herein. For example, the wearable computer system may visually distinguish a the view of the display screen within the optical head-mounted display for a predetermined amount of time in response to the successful establishment of the remote control session.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
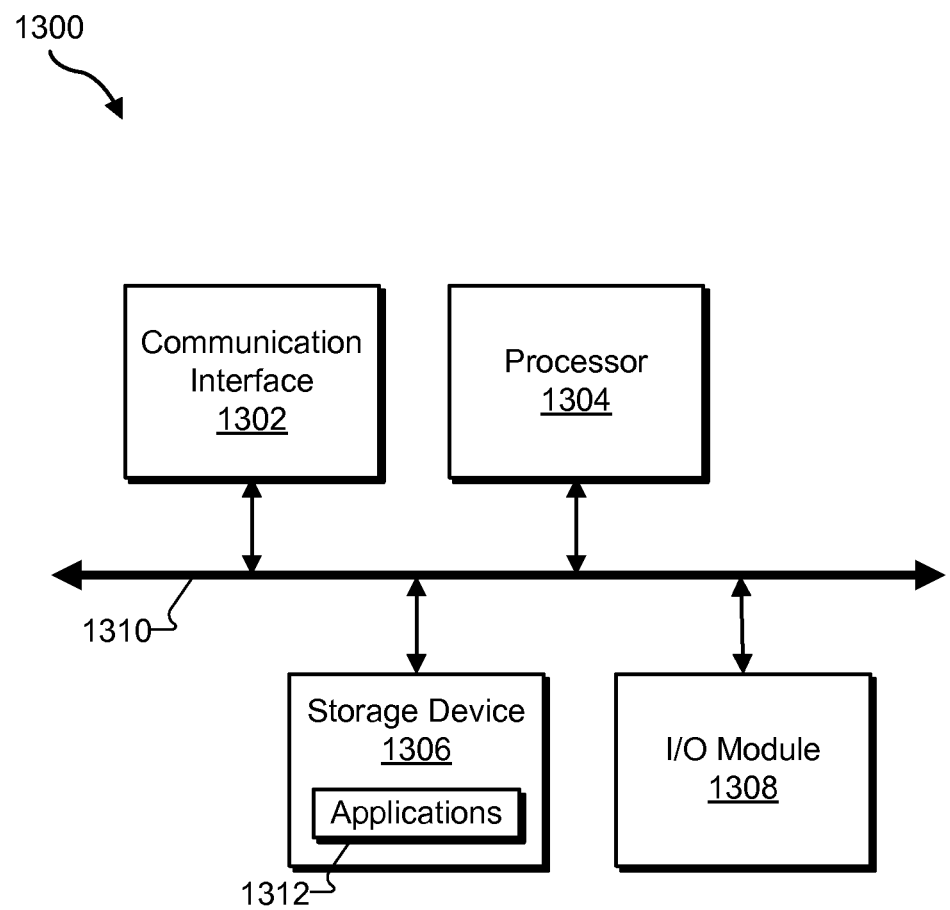
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device

1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with detection facility 102 and/or session management facility 104. Likewise, storage facility 106 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a remote control management system, that a user wearing a wearable computer system that includes an optical head-mounted display is looking through the optical head-mounted display at a display screen associated with a media content processing device;
   determining, by the remote control management system in response to the detecting that the user is looking through the optical head-mounted display at the display screen, that the media content processing device is executing an application that is controllable by the wearable computer system;
   querying, by the remote control management system in response to the detecting that the user is looking through the optical head-mounted display at the display screen, the media content processing device associated with the display screen for data representative of an identity of the media content processing device;
   analyzing, by the remote control management system, the data representative of the identity of the media content processing device to determine that the identity of the media content processing device is paired with a user profile of the user;
   determining, by the remote control management system based on the determination that the identity of the media content processing device is paired with the user profile of the user, that the user is authorized to interact with the application being executed by the media content processing device; and
   establishing, by the remote control management system in response to the determining that the media content processing device is executing the application and the determining that the user is authorized to interact with the application, a remote control session between the wearable computer system and the application.

2. The method of claim 1, further comprising visually distinguishing, by the remote control management system subsequent to the establishing of the remote control session between the wearable computer system and the application, a view of the display screen within the optical head-mounted display to indicate to the user that the remote control session between the wearable computer system and the application has been established.

3. The method of claim 1, further comprising visually distinguishing, by the remote control management system during the establishing of the remote control session between the wearable computer system and the application, a view of the display screen within the optical head-mounted display to indicate to the user that the remote control session between the wearable computer system and the application is being established.

4. The method of claim 1, further comprising:
   detecting, by the remote control management system during the remote control session, an action performed by the user; and
   providing, by the remote control management system in response to the action, a remote control command corresponding to the action to the application.

5. The method of claim 4, wherein the action comprises at least one of an eye movement performed by the user, a head movement performed by the user, a touch pad gesture performed by the user, and a voice command spoken by the user.

6. The method of claim 1, wherein the detecting that the user is looking through the optical head-mounted display at the display screen comprises using an object recognition service to determine that the user looks through the optical head-mounted display at the display screen for an uninterrupted predetermined amount of time.

7. The method of claim 1, wherein the determining that the media content processing device is executing the application that is controllable by the wearable computer system comprises determining that the media content processing device is executing an application that corresponds to a remote control application being executed by the wearable computer system while the user is looking through the optical head-mounted display at the display screen.

8. The method of claim 1, further comprising:
determining, by the remote control management system based on geographic information included in the user profile of the user, that the user is located within a geographic area pre-designated as being associated with the user by:
  detecting global positioning service ("GPS") coordinates of the user while the user is looking through the optical head-mounted display at the display screen, and
  determining that the GPS coordinates are located within the geographic area by comparing the detected GPS coordinates of the user to the geographic information included in the user profile;
wherein the determining that the user is authorized to interact with the application being executed by the media content processing device is further based on the determining that the user is located within the geographic area pre-designated as being associated with the user.

9. The method of claim 1, wherein the determining that the user is authorized to interact with the application being executed by the media content processing device further comprises determining that the wearable computer system and the media content processing device are both connected to a local area network linked to the user.

10. The method of claim 1, wherein the establishing of the remote control session between the wearable computer system and the application comprises:
using a discovery protocol to set up a bi-directional communication channel between the wearable computer system and the application by way of a local area network;
facilitating transmission of a remote control session request message that includes authorization credentials from the wearable computer system to the application by way of the bi-directional communication channel; and
facilitating transmission of a confirmation response from the application to the wearable computer system by way of the bi-directional communication channel, the confirmation response generated by the application in response to the application validating the authorization credentials.

11. The method of claim 1, wherein the application is associated with a media service.

12. The method of claim 11, wherein the method further comprises:
detecting, by the remote control management system, that the user is looking through the optical head-mounted display at a displayed end of a media content offering list associated with the media service and displayed on the display screen, the media content offering list comprising a list of entries representative of media content instances available by way of the media service; and
providing, by the remote control management system in response to the detecting that the user is looking through the optical head-mounted display at the displayed end of the media content offering list, a remote control command to the application for the application to scroll the media content offering list within the display screen.

13. The method of claim 11, wherein the method further comprises:
detecting, by the remote control management system, that the user is looking through the optical head-mounted display for a predetermined amount of time at an entry representative of a media content instance available by way of the media service; and
providing, by the remote control management system in response to the detecting that the user is looking through the optical head-mounted display for the predetermined amount of time at the entry representative of the media content instance, a remote control command to the application for the application to begin presenting the media content instance.

14. The method of claim 1, embodied as computer-executable instructions on at least one non-transitory computer-readable medium.

15. A method comprising:
detecting, by a wearable computer system worn by a user, that the user is looking through an optical head-mounted display associated with the wearable computer system at a display screen associated with a media content processing device;
determining, by the wearable computer system in response to the detecting that the user is looking through the optical head-mounted display at the display screen, that the media content processing device is executing an application that is controllable by the wearable computer system;
querying, by the wearable computer system in response to the detecting that the user is looking through the optical head-mounted display at the display screen, the media content processing device associated with the display screen for data representative of an identity of the media content processing device;
analyzing, by the wearable computer system, the data representative of the identity of the media content processing device to determine that the identity of the media content processing device is paired with a user profile of the user;
determining, by the wearable computer system based on the determination that the identity of the media content processing device is paired with the user profile of the user, that the user is authorized to interact with the application being executed by the media content processing device;
using, by the wearable computer system, a discovery protocol to set up a bi-directional communication channel between the wearable computer system and the application;
transmitting, by the wearable computer system, a remote control session request message that includes authorization credentials to the application by way of the bi-directional communication channel;
receiving, by the wearable computer system, a confirmation response from the application in response to the application validating the authorization credentials; and
notifying, by the wearable computer system in response to the receiving of the confirmation response, the user that a remote control session between the wearable computer system and the application has been successfully established.

16. The method of claim 15, embodied as computer-executable instructions on at least one non-transitory computer-readable medium.

17. A system comprising:
at least one computing device that:
  detects that a user wearing a wearable computer system that includes an optical head-mounted display is looking through the optical head-mounted display at a display screen associated with a media content processing device;

determines, in response to the detecting that the user is looking through the optical head-mounted display at the display screen, that the media content processing device is executing an application that is controllable by the wearable computer system;

queries, in response to the detection that the user is looking through the optical head-mounted display at the display screen, the media content processing device associated with the display screen for data representative of an identity of the media content processing device;

analyzing, by the remote control management system, the data representative of the identity of the media content processing device to determine that the identity of the media content processing device is paired with a user profile of the user;

determines, based on the determination that the identity of the media content processing device is paired with the user profile of the user, that the user is authorized to interact with the application being executed by the media content processing device; and establishes, in response to the determination that the media content processing device is executing the application and the determination that the user is authorized to interact with the application, a remote control session between the wearable computer system and the application.

18. The system of claim 17, wherein the at least one computing device:

detects, during the remote control session, an action performed by the user; and provides, in response to the action, a remote control command corresponding to the action to the application.

19. The system of claim 17, wherein the at least one computing device visually distinguishes, subsequent to the establishment of the remote control session between the wearable computer system and the application, a view of the display screen within the optical head-mounted display to indicate to the user that the remote control session between the wearable computer system and the application has been established.

20. The system of claim 17, wherein the at least one computing device visually distinguishes, during the establishment of the remote control session between the wearable computer system and the application, a view of the display screen within the optical head-mounted display to indicate to the user that the remote control session between the wearable computer system and the application is being established.

21. The method of claim 8, wherein the geographic information included in the user profile associated with the user defines at least one of:

boundaries of the geographic area pre-designated as being associated with the user; and a physical address associated with a media service account of the user.

22. The system of claim 17, wherein the at least one computing device:

determines, based on geographic information included in the user profile of the user, that the user is located within a geographic area pre-designated as being associated with the user by:

detecting global positioning service ("GPS") coordinates of the user while the user is looking through the optical head-mounted display at the display screen, and determining that the GPS coordinates are located within the geographic area by comparing the detected GPS coordinates of the user to the geographic information included in the user profile;

wherein the determination that the user is authorized to interact with the application being executed by the media content processing device is further based on the determination that the user is located within the geographic area pre-designated as being associated with the user.

* * * * *